(12) United States Patent
Seki

(10) Patent No.: US 12,159,549 B2
(45) Date of Patent: Dec. 3, 2024

(54) SCREEN READER SOFTWARE FOR GENERATING A BACKGROUND TONE BASED ON A SPATIAL LOCATION OF A GRAPHICAL OBJECT

(71) Applicant: RED HAT, INC., Raleigh, NC (US)

(72) Inventor: Lucio Seki, Sorocaba-SP (BR)

(73) Assignee: Red Hat, Inc., Raleigh, NC (US)

( * ) Notice: Subject to any disclaimer, the term of this patent is extended or adjusted under 35 U.S.C. 154(b) by 29 days.

(21) Appl. No.: 17/836,607

(22) Filed: Jun. 9, 2022

(65) Prior Publication Data

US 2023/0401980 A1   Dec. 14, 2023

(51) Int. Cl.
   *G09B 21/00* (2006.01)
   *G06F 3/16* (2006.01)
   *G10L 13/08* (2013.01)

(52) U.S. Cl.
   CPC ........... *G09B 21/006* (2013.01); *G06F 3/167* (2013.01); *G10L 13/08* (2013.01)

(58) Field of Classification Search
   CPC ......... G09B 21/006; G10L 13/08; G06F 3/16; G06F 3/162; G06F 3/165; G06F 3/167; H04M 1/72481
   See application file for complete search history.

(56) References Cited

U.S. PATENT DOCUMENTS

| | | |
|---|---|---|
| 5,287,102 A | 2/1994 | McKiel, Jr. |
| 5,470,233 A | 11/1995 | Fruchteman et al. |
| 7,194,411 B2 | 3/2007 | Slotznick et al. |
| 7,913,188 B1 | 3/2011 | Krenz et al. |
| 8,037,414 B2 * | 10/2011 | Michaelis ............... G06F 3/167 715/729 |
| 8,826,137 B2 | 9/2014 | Hofstader et al. |
| 9,165,478 B2 | 10/2015 | Carro et al. |
| 9,576,501 B2 | 2/2017 | Seki |

(Continued)

FOREIGN PATENT DOCUMENTS

| | | | |
|---|---|---|---|
| CN | 1271148 A | | 10/2000 |
| JP | 2006171544 A | * | 6/2006 |
| WO | WO-2022009229 A1 | * | 1/2022 |

OTHER PUBLICATIONS

Sodnik et al., "Enhanced synthesized text reader for visually impaired users", 2010 Third International Conference on Advances in Computer-Human Interaction, Mar. 15, 2010, pp. 91-94.

(Continued)

*Primary Examiner* — Kieu D Vu
*Assistant Examiner* — Blaine T. Basom
(74) *Attorney, Agent, or Firm* — Kilpatrick Townsend & Stockton LLP

(57) ABSTRACT

A system can determine a first coordinate location and a second coordinate location collectively representing a spatial positioning of a graphical object in a user interface. The system can determine a first pitch for a foreground sound based on the first coordinate location. The foreground sound may be a synthesized voice describing textual content associated with the graphical object. The system can determine a second pitch for a background sound based on the second coordinate location. The system can generate an audio signal configured to cause an audio device to output a composite sound that includes the foreground sound at the first pitch and the background sound at the second pitch.

17 Claims, 4 Drawing Sheets

(56) References Cited

U.S. PATENT DOCUMENTS

| | | | |
|---|---|---|---|
| 10,175,941 B2* | 1/2019 | Molesky | G06F 3/0485 |
| 10,191,979 B2 | 1/2019 | Summers, II et al. | |
| 10,402,159 B1* | 9/2019 | Darrah | G06F 3/167 |
| 10,583,067 B2 | 3/2020 | Kline et al. | |
| 11,257,396 B2 | 2/2022 | Summers, II et al. | |
| 2006/0212790 A1* | 9/2006 | Perantatos | G06F 3/0486 707/E17.116 |
| 2007/0211071 A1 | 9/2007 | Slotznick et al. | |
| 2009/0055186 A1 | 2/2009 | Lance et al. | |
| 2010/0241350 A1 | 9/2010 | Cioffi et al. | |
| 2011/0244954 A1 | 10/2011 | Goldman et al. | |
| 2012/0120104 A1 | 5/2012 | Kuhne | |
| 2012/0280087 A1 | 11/2012 | Coffman et al. | |
| 2013/0042180 A1 | 2/2013 | Sai et al. | |
| 2013/0232506 A1 | 9/2013 | Mazzoni et al. | |
| 2014/0129937 A1 | 5/2014 | Jarvinen et al. | |
| 2014/0164894 A1* | 6/2014 | Bellamy | G06F 16/957 715/209 |
| 2017/0229040 A1 | 8/2017 | Joshi et al. | |
| 2017/0347219 A1 | 11/2017 | McCauley et al. | |
| 2018/0232200 A1* | 8/2018 | Rabellino | G06F 3/167 |
| 2019/0166448 A1 | 5/2019 | Laaksonen et al. | |
| 2020/0132501 A1 | 4/2020 | Czarnecki | |
| 2020/0167058 A1 | 5/2020 | Ragan, Jr. | |

OTHER PUBLICATIONS

Cofino et al., "Sonically Spatialized Screen Reading: Aiming to Restore Spatial Information for Blind and Low-Vision Users", Electrical and Computer Engineering Department Florida International University, Miami, FL, 2012, pp. 1-6.

Heuten et al., "Interactive Exploration of City Maps with Auditory Torches", In CHI 2007 Extended Abstracts on Human Factors in Computing Systems, Apr. 28-May 3, 2007, pp. 1959-1964.

Stewart et al., "Spatial Auditory Display for Acoustics and Music Collections", Available Online at: http://theleadingzero.com/research/papers/phdthesis.pdf, Jul. 2010, pp. 1-185.

Zhao, "Interactive Sonification of Abstract Data: Framework, Design Space, Evaluation, and User Tool", Available Online at http://www.cs.umd.edu/hcil/audiomap/publications/dissertatioin-submitted.pdf, Apr. 24, 2006, pp. 1-288.

* cited by examiner

SCREEN READER SOFTWARE FOR GENERATING A BACKGROUND TONE BASED ON A SPATIAL LOCATION OF A GRAPHICAL OBJECT

TECHNICAL FIELD

The present disclosure relates generally to screen reader software that renders text and image content as speech. More specifically, but by now way of limitation, this disclosure relates to screen reader software that is configured to provide a background tone that varies in frequency based on a spatial location of a graphical object in a user interface.

BACKGROUND

Screen reader software may be useful to the visually impaired. The screen reader software may convey what sighted users see on a display with non-visual means, like text-to-speech, sound icons, or a braille device. Screen reader software may create non-visual outputs by interacting with dedicated accessibility application program interfaces (APIs), using various operating system features, and employing other techniques.

DETAILED DESCRIPTION

Figure 1:
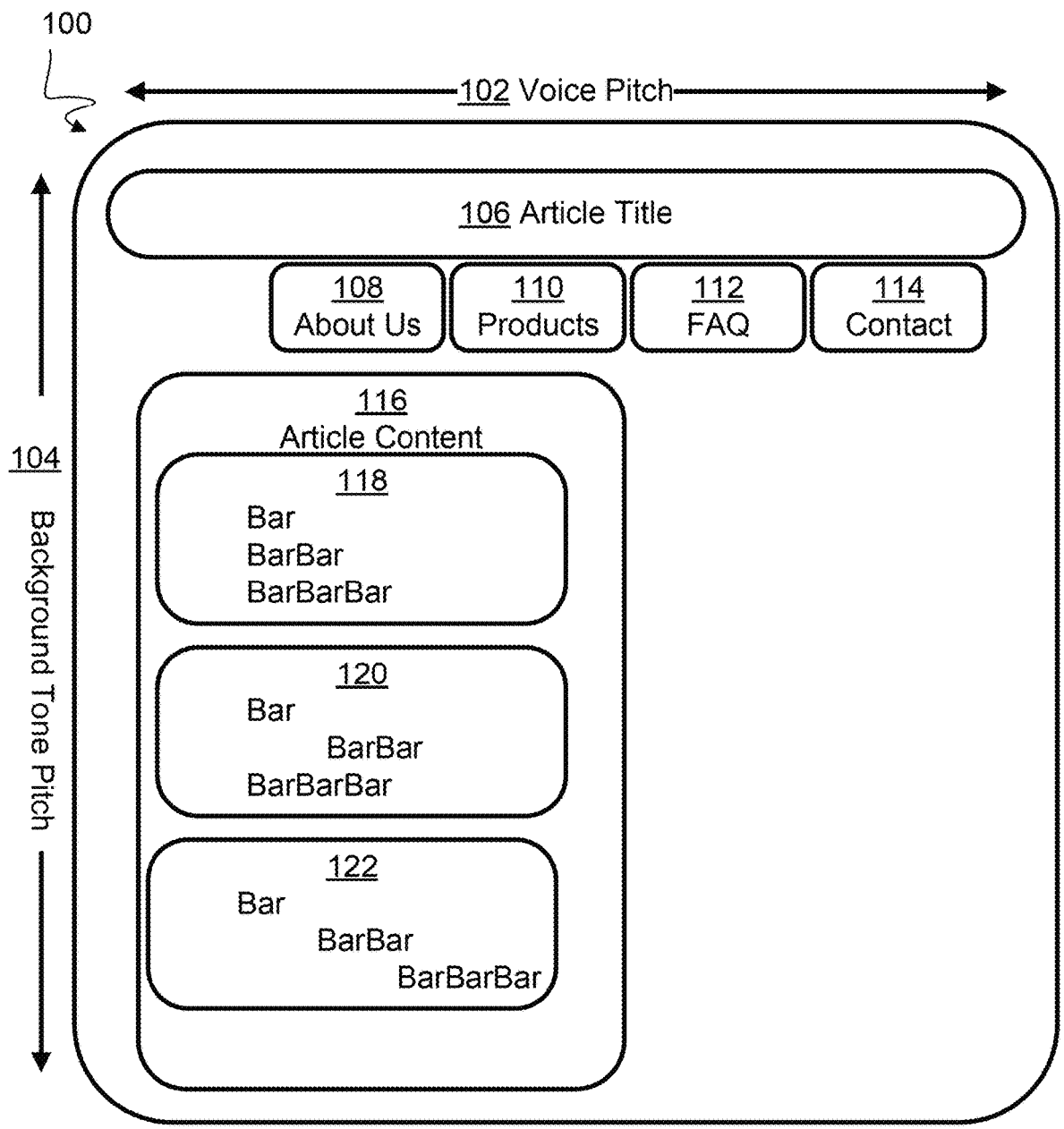
FIG. 1 shows an example of a user interface (UI), navigable by a voice pitch and a background tone pitch, according to some aspects of the present disclosure.

Sighted users often interact with graphical user interfaces using visual cues. For example, sighted users may rely on scrollbar positions to indicate their progression within text on a page. Visually impaired users, on the other hand, may be unable to make use of such visual cues. For example, a visually impaired user may be unable to see a scrollbar and may thus be unable to determine their progression within text on a page. Some techniques exist to help visually impaired users navigate a page in such scenarios. Those techniques may employ a stereo panning effect to help visually impaired users navigate a page. But, such stereo panning effects require at least two audio devices (e.g., speakers) and tend to be limited by the computational complexity of achieving the stereo panning effect. The stereo panning effect may also be limited by the information available to the accessibility software that is generating the panning effect about the text or user interface. Furthermore, use of stereo sound may be limited by a user's hardware or a user's physical space. For example, stereo speakers placed close together because of insufficient space may not usefully convey the panning effect to a user.

Some examples of the present disclosure can overcome one or more of the abovementioned problems by audibly representing the user's position within text or a graphical user interface with a background tone of varying frequency. Rather than using a graphical user interface item or an audible stereo effect to indicate progress within text, a background tone may be produced for the benefit of visually impaired users. In some examples, the background tone may rise from an initial frequency, which may output near a beginning of a text, to a final frequency, which may output near an end of the text. The text may be an entry composed of sentences that can be read continuously. The position indicated by the background tone may be analogous to the position indicated by a scrollbar for a sighted user. In some examples, the background tone may also be used to indicate the vertical spatial position of a cursor or another selection element within a graphical user interface, such as a webpage composed of multiple buttons and links that may be arranged in various vertical and horizontal positions when represented visually.

An audio device may output a background tone to indicate a vertical position in a text or graphical user interface. In some examples, the vertical position may be an abstraction that exists only in a memory of a computing device. For instance, the vertical position within a 5,000-word article may not be represented visually by the user's hardware. This may occur because the user's hardware may have no visual output (e.g., if the user is visually impaired and the user's hardware lacks a display). The system may cause the background tone to be output at a lower frequency, initial tone at or near the top of the text or graphical user interface. And the system may cause the background tone to be output a higher frequency, final tone at or near the bottom of the text or graphical user interface. The system may cause the background tone to be output at intermediate frequencies at corresponding intermediate positions within the text or graphical user interface. In this way, the system can generate a background tone that can indicate the vertical position of the user in the text or graphical user interface.

A background tone may offer an additional dimension of navigation that can be used in conjunction with a stereo panning effect, a variance in a frequency range of the text-to-speech voice, a braille output, or other forms of assistive technology. In some examples, the background tone may be analogous to a vertical position in a text or graphical user interface while the frequency of the text-to-speech voice may be analogous to a horizontal position. The horizontal position and the corresponding changes in the frequency of the text-to-speech voice may represent discrete horizontal information, such as tab stops or horizontally arranged items within a graphical user interface, such as icons on a horizontal task bar. Software controlling the frequency of the text-to-speech voice may maintain a single frequency or a frequency range while reading left-to-right, depending on the horizontal information being read, so that the user is not presented with a constant rising and falling frequency range of the text-to-speech voice that may be audibly distracting. For example, the system may raise the frequency range of the text-to-speech voice to indicate certain predesignated interface elements (e.g., a tab-over or to read a new icon in a taskbar), but may otherwise maintain a default frequency or a default frequency range when reading a sentence spanning the horizontal length of the screen is read aloud.

In some examples, the background tone may represent a horizontal position and the tone of the text-to-speech voice may represent the vertical position. One such example may be where text is read vertically, such as in the Japanese language. In some examples the background tone may be replaced with a periodic background sound, such as a clicking or percussive sound that may rise in fall in tempo to indicate position. In some examples the background tone may be replaced with a vibration or haptic feedback, which may rise and fall in frequency to indicate position. In some examples the background tone may include multiple tones, such as a chord tone that may rise and fall while maintaining consistent frequency intervals between the multiple tones.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 shows an example of a user interface (UI), navigable by a voice pitch 102 and a background tone pitch 104 according to some aspects of the present disclosure. In this example, a voice pitch 102 indicates a horizontal position within the UI 100. The voice pitch 102 can be the frequency range of a text-to-speech output that reads the textual information in the UI 100. A background tone pitch 104 represents a vertical position within the UI. The UI 100 contains various UI items and textual content.

The background tone pitch 104 may rise in frequency as a user navigates vertically from the article title 106, down to the about us icon 108, down to the article content 116. The background tone pitch 104 may rise in frequency while progressing through the content of the first text block 118, the second text block 120, and the third text block 122. The background tone pitch 104 may rise to indicate progress within the first text block 118, may rise to indicate progress within the second text block 120, and may rise to indicate progress within the third text block 122. The voice pitch 102 may vary within a block of text to indicate an indentation level. For example, the voice pitch 102 may remain static while reading the first text block 118. When reading the second text block 120, the voice pitch 102 may read at a first frequency range for the first line, a higher second frequency range for the second line, and return to the first frequency range for the third line. While reading the third text block 122, the voice pitch 102 may read at the first frequency range for the first line, the second frequency range for the second line, and an even higher third frequency range for the third line.

The background tone pitch 104 may fall in frequency as the user navigates up from the article content 116, up to the about us icon 108, up to the article title 106. The background tone pitch 104 may remain the same as the user navigates horizontally from the about us icon 108, to the products icon 110, to the FAQ icon 112, to the contacts icon 114. The background tone pitch 104 may remain the same to indicate a held position on any of the UI items in the UI 100. Although the above examples involve the background tone pitch 104 rising to indicate vertical movement down the page, in other examples the background tone pitch 104 may work in the opposite manner. For example, the background tone pitch 104 may fall in frequency as a user vertically navigates from the article title 106, down to the about us icon 108, down to the article content 116. Such an example may be enabled by user preferences.

The voice pitch 102 may rise in frequency range as a user navigates horizontally from the about us icon 108, to the products icon 110, to the FAQ icon 112, to the contacts icon 114. The voice pitch 102 may rise in frequency range and return to a previous frequency range to indicate a tab over in the second text block 120. The synthesized voice may rise in frequency range to indicate a first tab over in third text block 122 and rise in frequency range again to indicate a second tab over in the third text block 122. The voice pitch 102 may remain at the same frequency range while reading the content of the first text block 118. Although the above examples involve the voice pitch 102 rising to indicate horizontal movement from left-to-right across the page, in other examples the voice pitch 102 may work in the opposite manner. For example, the voice pitch 102 may fall in frequency range as a user navigates horizontally from the about us icon 108, to the products icon 110, to the FAQ icon 112, to the contacts icon 114. Such an example may be enabled by user preferences.

The system can determine the background tone pitch 104 and the voice pitch 102 and output the background tone and the voice concurrently, which can collectively provide spatial awareness to the listener. For example, the combination of the background tone pitch 104 and the voice pitch 102 can help the listener understand their current spatial position within the overall UI 100. In some examples, the system can output the background tone and the voice simultaneously using a single audio device (e.g., a speaker), so that complex stereo processing and a stereo speaker arrangement is not needed. Of course, in other examples in which the system has multiple audio devices, the system may output the background tone via one audio device and the voice via another audio device.

Figure 2:
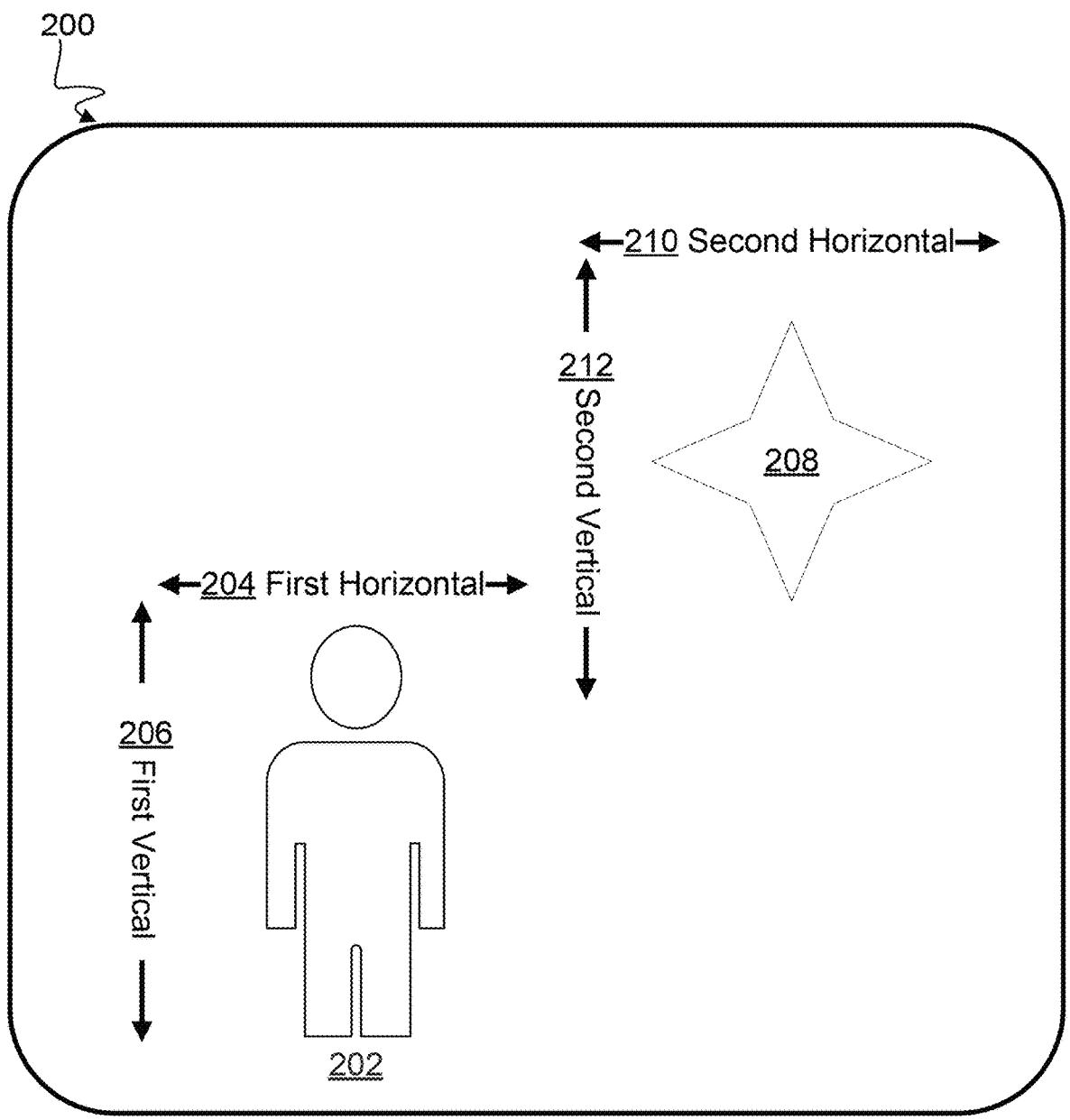
FIG. 2 shows another example of a UI, navigable by sound characteristics, according to some aspects of the present disclosure.

FIG. 2 shows another example of a UI 200, navigable by sound characteristics, according to some aspects of the present disclosure. The UI 200 can include a first interface object 202 and a second interface object 208. One example of the UI 200 may be a three-dimensional virtual world associated with a video game. The position of a first interface object 202 along a horizontal axis within the UI 200 may be represented by a first horizontal sound characteristic 204. The position of the first interface object 202 along a vertical axis within the UI 200 may be represented by a first vertical sound characteristic 206. The position of a second interface object 208 along the horizontal axis may be represented by a second horizontal sound characteristic 210. The position of the second interface object 208 along the vertical axis may be represented by a second vertical sound characteristic 212. A horizontal sound characteristic can be a sound characteristic configured to indicate a horizontal location of an interface object. A vertical sound characteristic can be a sound characteristic configured to indicate a vertical location of an interface object. Examples of such sound characteristics can include pitch, amplitude, duration, tempo, etc.

For example, the position of the first interface object 202 can be represented by a tone that has a specific frequency and a specific amplitude. The specific frequency may indicate the horizontal position of the first interface object 202 in the UI 200, and the specific amplitude may represent the vertical position of the first interface object 202 in the UI 200. In some such examples, the first horizontal sound characteristic 204 may be the frequency and the first vertical sound characteristic 206 may be the amplitude. The first horizontal sound characteristic 204, the first vertical sound characteristic 206, the second horizontal sound characteristic 210, or the second vertical sound characteristic 212 may be produced continuously or toggled on and off by an input from a user.

A change in the horizontal position of the first interface object 202 may cause the first horizontal sound characteristic 204 to change. Similarly, a change in the vertical position of the first interface object 202 may cause the first vertical sound characteristic 206 to change. For example, the first interface object 202 may move from the bottom left of the UI 200 to top right of the UI 200. A piano note may be used to indicate the horizontal position of the first interface object 202 and may comprise the first horizontal sound characteristic 204. A snare drum sound may be used to indicate the vertical position of the first interface object 202 and may comprise the first vertical sound characteristic 206. As the first interface object 202 moves in the UI 200, the piano note may rise in frequency to indicate that the first interface object 202 is moving from the left of the UI 200 to the right of the UI 200. And an increase in the tempo of the snare drum may indicate that the first interface object 202 is moving from the bottom of the UI 200 to the top of the UI 200.

Alternatively, the position of first interface object 202 may be represented by a single sound that varies in its characteristics. For example, the spatial location of the first interface object 202 may be represented by a pulsed piano note. The first horizontal sound characteristic 204 may be the frequency of the piano note. The first vertical sound characteristic 206 may be the tempo of the same piano note. The first interface object 202 may move from the lower left of the UI 200 to the upper right of the UI 200. As the first interface object 202 moves, the frequency of the piano note may or fall rise and the tempo of the pulse of the piano note may also rise or fall, depending on the configuration.

The position of the second interface object 208 may be represented in a horizontal dimension with the second horizontal sound characteristic 210 having at least one characteristic that is distinct from the first horizontal sound characteristic 204. For example, the horizontal position of the first interface object 202 may be represented by a sustained piano note of varying frequency while the horizontal position of the second interface object 208 may be represented by a sustained guitar note of varying frequency. Similarly, the position of the second character may be represented in a vertical dimension with the second vertical sound characteristic 212 having at least one characteristic that is distinct from the first vertical sound characteristic 206. For example, the vertical position of the first interface object 202 may be represented by a snare drum sound of varying tempo while the vertical position of the second interface object 208 may be represented by a cymbal sound of varying tempo.

In some examples, the locations of the first interface object 202 and the second interface object 208 may be each represented by a single dedicated sound that may vary across several qualities. For example, the first interface object 202 may be represented by a pulsed piano note. The first horizontal sound characteristic 204 may be the frequency of the pulsed piano note. The first vertical sound characteristic 206 may be tempo of the same pulsed piano note. The second interface object 208 may be represented by a pulsed guitar note. The second horizontal sound characteristic 210 may be the frequency of the same pulsed guitar note. The second vertical sound characteristic 212 may be the tempo the pulsed guitar note.

In some examples, qualities between the first horizontal sound characteristic 204 and the second horizontal sound characteristic 210, or the first vertical sound characteristic 206 and the second vertical sound characteristic 212, may indicate the relative spatial relationship between the first interface object 202 and the second interface object 208. For example, if a frequency of a pulsed piano note representing the first horizontal sound characteristic 204 matches the frequency of a pulsed guitar note representing the second horizontal sound characteristic 210, then the first interface object 202 and the second interface object 208 may be in the same horizontal position within the UI 200. If the tempo of the pulsed piano note representing the first vertical sound characteristic 206 matches the tempo of the pulsed guitar note representing the second vertical sound characteristic 212, the first interface object 202 and the second interface object 208 may be in the same vertical position within the UI. If the frequency (e.g., pitch) and tempo of the pulsed piano note and the frequency and tempo of the pulsed guitar note match, the first interface object 202 and the second interface object 208 may be in an overlapping position within the UI.

In some examples, the first interface object 202 and the second interface object 208 may be represented as graphical user interface items, such as icons. In some examples, the first interface object 202 may be a block of text and the second interface object 208 may be a cursor navigating the block of text. In such an example, the first interface object 202 may be read aloud by a text-to-speech software. The first horizontal sound characteristic 204 may be the frequency of the synthesized voice of the text-to-speech software, which may indicate a horizontal position within the text that may vary with horizontal formatting conventions such as tab-overs. The first vertical sound characteristic 206 may be the frequency of a sustained piano note, which may vary with the position within the text block indicating the position currently being read aloud by the synthesized voice. The second interface object 208, as a cursor, may allow a user to navigate the portion of text as the portion of text is read aloud without interrupting the text-to-speech software. For example, the second vertical sound characteristic 212 may be a sustained guitar note that may rise and fall in frequency as a user navigates through the block of text and may match the frequency of the sustained piano note output as the first vertical sound characteristic 206 when the second interface object 208, acting as a cursor, has the sentence, line, or other suitable discrete component of the portion of text selected.

In some examples, the first interface object 202 and the second interface object 208 may be entities in a video file or a video feed that have been identified as discrete entities by facial recognition software. In some examples, the first interface object 202 or the second interface object 208 may be a combination of portions of text, icons, cursors, windows, or any combination of suitable user interface objects.

Other sonic qualities besides tonal frequency, timbre (e.g., the audible difference between a piano and a guitar playing the same note) and tempo can be used as the first horizontal sound characteristic 204, the first vertical sound characteristic 206, the second horizontal sound characteristic 210, and the second vertical sound characteristic 212. Non-limiting examples include volume, attack, decay, sustain, release, signal gain, variance in equalization, and echo.

Figure 3:
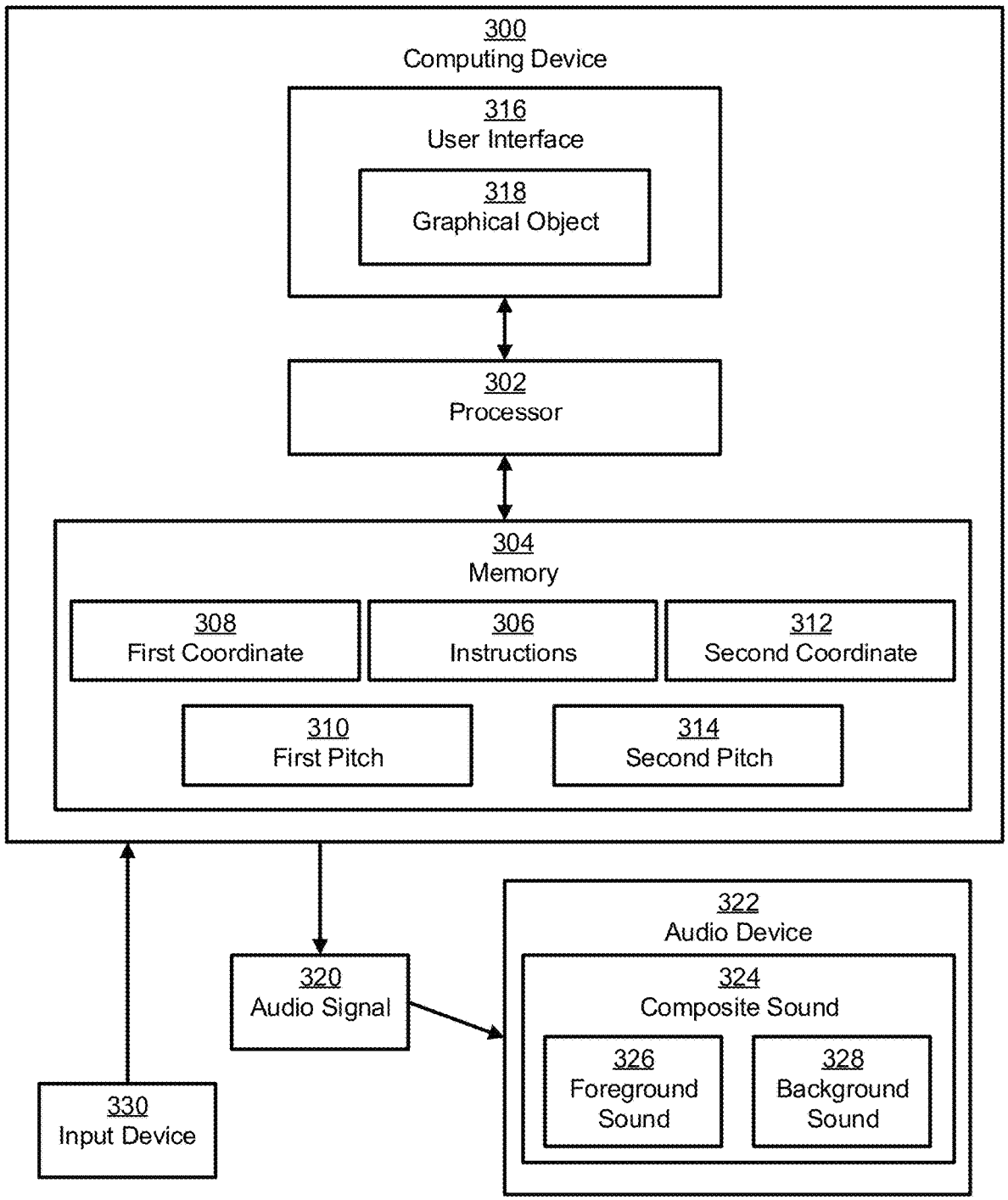
FIG. 3 shows a block diagram of an example of a computing device controlling a composite sound according to some aspects of the present disclosure.

FIG. 3 is a block diagram of an example of a computing device 300 controlling a composite sound 324 according to some aspects of the present disclosure. The computing device 300 includes a processor 302 that is communicatively coupled to a memory 304. In some examples, the processor 302 and the memory 304 may be distributed from (e.g., remote to) one another. The computing device 300 is communicatively coupled to an audio device 322, which may be internal or external to the computing device 300.

The processor 302 can include one processing device or multiple processing devices. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in a suitable computer-programming language, such as C, C++, C#, etc.

The memory 304 can include one memory device or multiple memory devices. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory, computer-readable medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

The processor 302 can execute the instructions 306 to perform operations. For example, the processor 302 can generate a user interface 316 that may contain at least one graphical object 318. The processor 302 can determine a first coordinate 308 associated with a horizontal position of the graphical object 318 in the user interface 316 and a second coordinate 312 associated with a vertical position of the graphical object 318 in the user interface 316. The processor 302 may derive the first coordinate 308 and the second coordinate 312 from accessibility application program interfaces, such as Microsoft Active Accessibility or Java Access Bridge. The processor 302 may derive the first coordinate 308 and the second coordinate 312 by inter-process communication, querying properties of the user interface 316, employing hooking techniques, or using other techniques.

The processor 302 may determine a first pitch 310 for a foreground sound 326 based on the first coordinate 308 and may determine a second pitch 314 fora background sound 328 based on the second coordinate 312. The processor 302 can determine the first pitch 310 and the second pitch 314 by using an algorithm for mapping coordinates to pitches, a predefined lookup table for mapping of coordinates to pitches, or any other suitable technique. The processor 302 can then generate an audio signal 320 that includes the foreground sound 326 at the first pitch 310 and the background sound 328 at the second pitch 314. Having generating the audio signal, the processor 302 can transmit the audio signal 320 to an audio device 322, such as a speaker. The audio device 322 may output the audio signal 320 as a composite sound 324 that includes both the foreground sound 326 and the background sound 328 concurrently. The foreground sound 326 may be a text-to-voice output. The background sound 328 may be a background tone. The frequency of the foreground sound 326 may represent either the first coordinate 308 or the second coordinate 312. The frequency of the background sound 328 may represent either the first coordinate 308 or the second coordinate 312, but may be sufficiently distinct so as to not be audibly perceived as the same as the foreground sound 326.

In some examples, the graphical object 318 may change in horizontal position over time, which may change the first coordinate 308 as observed by the processor 302. Based on the horizontal change in the first coordinate 308, the processor 302 may change the frequency of the foreground sound 326 or the background sound 328 within the composite sound 324. The graphical object 318 may additionally or alternatively change in vertical position, which may change the second coordinate 312 as observed by the processor 302. Based on the vertical change in the second coordinate 312, the processor 302 may change the frequency of the foreground sound 326 or the background sound 328 within the composite sound 324.

In some examples, the computing device 300 may be coupled to at least one input device 330. Examples of input devices can include refreshable braille displays or braille terminals, microphones for spoken commands, keyboards, keypads, foot pedals, gamepads, adaptive controllers such as the Microsoft Xbox Adaptive Controller, remotes, touchpads, computer mice, trackballs, bar code readers, accelerometers, gyroscopes, magnetometers, proximity sensors, barometers, ultrasonic transducers to detect movement and range of objects, light detection and ranging lasers (LIDAR), thermometers, joysticks, jog dials, and cameras for motion and gesture sensing. The input devices may be used to navigate through the user interface 316.

The input devices may be used to alter user preferences associated with the foreground sound 326 or the background sound 328. Examples of such user preferences adjustable by the input device 330 can include the sonic characteristics or sound schemes that are to be applied to the foreground sound 326 and the background sound 328. In some examples, the input device 330 may allow adjustments to the first pitch 310, the second pitch 314, additional pitches, the foreground sound 326, and the background sound 328. The adjustments may be made separately from interacting with the user interface 316. For example, a laptop computer may output a webpage as the user interface 316. A user can use the input device 330 to adjust the reading speed of the synthesized voice constituting the foreground sound 326, separately from navigating through the webpage.

Figure 4:
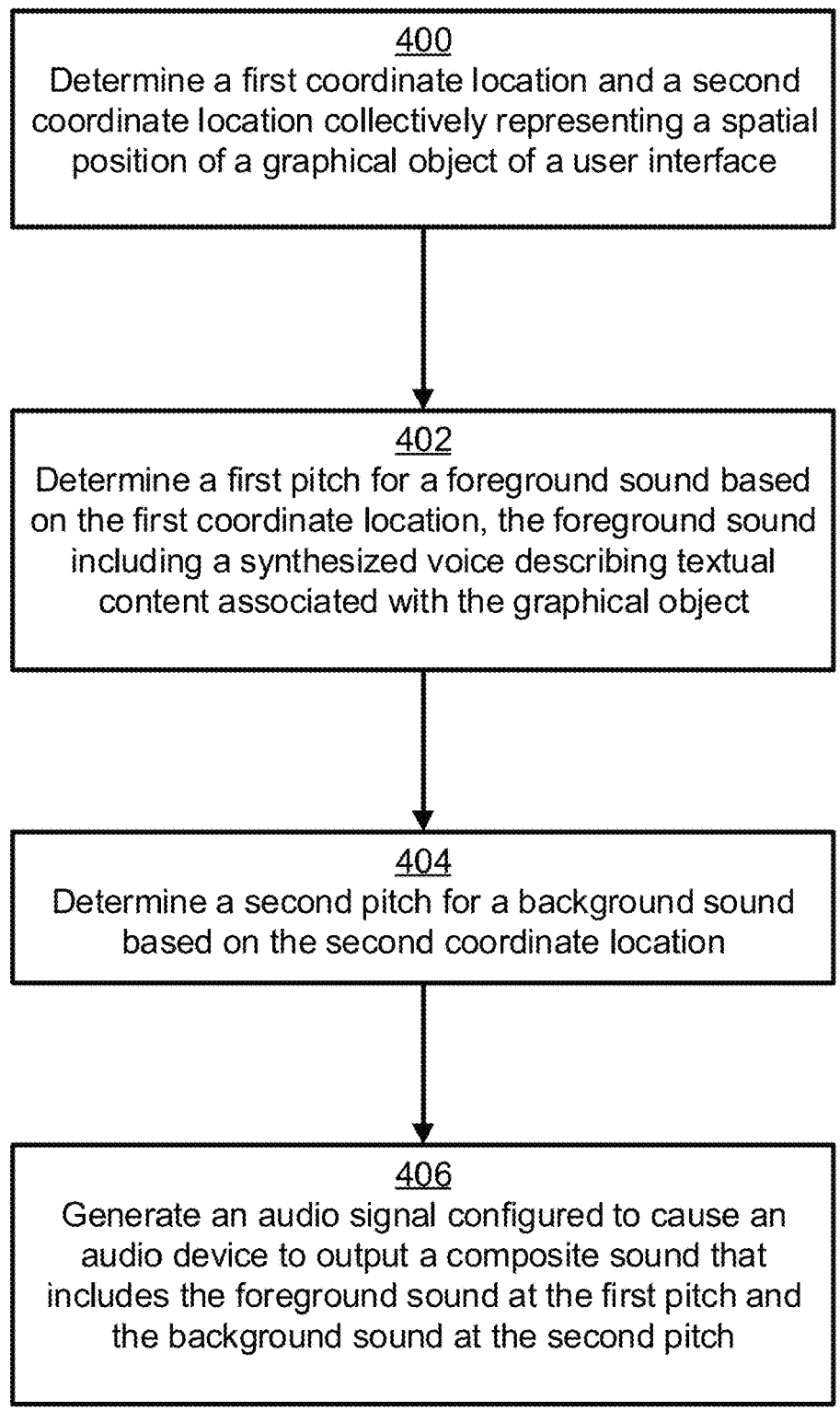
FIG. 4 shows a flow chart of an example of a process for representing locations of graphical objects using sound pitches according to some aspects of the present disclosure.

FIG. 4 is a flow chart of an example of a process for representing locations of graphical objects using sound pitches according to some aspects of the present disclosure. Some examples may include more steps, fewer steps, different steps, or a different combination of steps than is shown in FIG. 4. The steps of FIG. 4 are described below with reference to the components of FIG. 3 described above.

In block 400, the processor 302 determines a first coordinate 308 location and a second coordinate 312 location collectively representing a spatial positioning of a graphical object 318 of a user interface 316. The graphical object 318 may be a portion of text, an icon, a link, a checkbox, a radio button, a dropdown button, an item within a dropdown menu, a toggle button, a text input field, a search field, a pagination button, a tag, a slider, an image within an image carousel, a notification, a progress bar, or any other suitable user interface element. In some examples, the first coordinate 308 location may be a horizontal location and the second coordinate 312 location may be a vertical location. In some examples, the first coordinate 308 location may be a vertical location and the second coordinate 312 location may be a horizontal location.

In some examples, the user interface 316 may be any visual interface that may be provided using screens, transparent displays, dials, indicator lights, meters, switches, indicators, projections, or any combination of these. In some examples, the user interface 316 may have no visual correlate and instead may have been developed to be navigated primarily through auditory feedback. The user interface 316 may be provided via any suitable computing device. Examples of such computing devices can include smartphones, laptop computers, eBooks, televisions, game consoles such as XBOX®, Nintendo®, or PlayStation®, home appliances such as dishwashers, laundry machines, and thermostats, automated teller machines, vending machines, and point of sales devices.

The user interface 316 may control a variety of applications executable by the aforementioned computing devices. Examples of such applications include web browsers, such as those released by Microsoft®, Google®, Mozilla®, or Opera®; word processors such as Microsoft Word®; email clients such as Microsoft Outlook®; software development environments such as Microsoft Visual Studio Code®; audio-visual content editing software, such as the set of applications within the Adobe Creative Cloud®; eBook readers, such as the software that supports the Amazon Kindle® File Format or the Adobe Portable Document Format (PDF)®; and menus for various computing devices and appliances.

In some examples, additional coordinate locations may be identified to represent additional graphical objects with the user interface 316. For example, a third coordinate may represent the location of a cursor within a portion of text within the user interface 316.

In block 402, the processor 302 determines a first pitch 310 for a foreground sound 326 based on the first coordinate 308 location, the foreground sound 326 including a synthesized voice describing textual content associated with the graphical object. The resulting first pitch 310 may remain static as the synthesized voice reads content that is not suitably demarcated to have a varying position. For example, the synthesized voice may read a portion of text at a sustained frequency range instead of rising and falling as the voice reads what a signed user would see as content read left to right. The resulting frequency range may vary as the synthesized voice reads content that is suitably demarcated to have a varying position. For example, the synthesized voice may raise in frequency range to indicate a tab over, and return to a previous frequency range to indicate a return to a margin defining a boundary of a portion of text.

In block 404, the processor 302 determines a second pitch 314 for a background sound 328 based on the second coordinate location. The resulting second pitch 314 may remain static as a user navigates in a direction not associated with the second pitch 314. For example, the second pitch 314 may remain static as a user navigates horizontally between icons on a taskbar. The second pitch 314 may vary as a user navigates through a direction associated with the second pitch 314. For example, the second pitch 314 may vary as a user navigates through a vertically oriented drop-down menu. The second pitch 314 may also vary as text is progressed through vertically by being read aloud by a synthesized voice. For example, the second pitch 314 may rise in frequency as a portion of text nears completion as read aloud by a synthesized voice.

In some examples, additional pitches may be determined for additional coordinate locations. For example, a third pitch may correspond to a third coordinate that may describe the position of a cursor within a block of text.

In block 406, the processor 302 generates an audio signal 320 configured to cause an audio device 322 to output a composite sound 324 that includes the foreground sound 326 at the first pitch 310 and the background sound 328 at the second pitch 314. The foreground sound 326 can be output concurrently with the background sound 328. The foreground sound 326 may be a synthesized voice. The background sound 328 may be a tone outputted in a sustained manner, output at regular intervals, or output only when requested by user input. In some examples, the tempo of a percussive sound, such as a clicking sound, may vary in accordance with the second coordinate 312.

In some examples, the composite sound 324 may contain a second background sound that may convey additional information to a user. For example, the second background sound may indicate the position of a cursor within a block of text. Alternatively, a third coordinate may alter the tempo of the background sound 328 to convey additional information, such as the position of a cursor within a block of text.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

What is claimed is:

1. A non-transitory computer-readable medium comprising program code that is executable by a processor for causing the processor to:
   determine a first coordinate location and a second coordinate location that represent a spatial position of a graphical object in a user interface;
   determine a first pitch for a foreground sound based on the first coordinate location, the foreground sound including a synthesized voice describing textual content associated with the graphical object;
   determine a second pitch for a background sound based on the second coordinate location;
   cause an audio device to output a composite sound that includes the foreground sound with the first pitch and the background sound with the second pitch;
   subsequent to causing the audio device to output the composite sound:
      determine a change in the first coordinate location of the graphical object and a change in the second coordinate location of the graphical object;
      determine a first modification to the foreground sound based on the change in the first coordinate location;
      determine a second modification to the background sound based on the change in the second coordinate location; and
      cause the audio device to output an updated composite sound that includes the foreground sound with the first modification and the background sound with the second modification;
   determine a third coordinate location and a fourth coordinate location that represents a spatial position of a second graphical object in the user interface, wherein the second graphical object is output concurrently with the graphical object in the user interface;
   determine a third pitch for a third sound based on the third coordinate location;
   determine a tempo for the third sound based on the fourth coordinate location; and
   cause the audio device to output the third sound having the third pitch and the tempo.

2. The non-transitory computer-readable medium of claim 1, wherein the first coordinate location is a horizontal location along a horizontal axis of a coordinate system, and the second coordinate location is a vertical location along a vertical axis of the coordinate system.

3. The non-transitory computer-readable medium of claim 1, wherein the first coordinate location is a vertical location along a vertical axis of a coordinate system, and the second coordinate location is a horizontal location along a horizontal axis of the coordinate system.

4. The non-transitory computer-readable medium of claim 1, wherein the background sound includes a tone with the second pitch.

5. The non-transitory computer-readable medium of claim 1, wherein the tempo is a first tempo, and further comprising program code that is executable by the processor for causing the processor to:
   determine a fifth coordinate location and a sixth coordinate location that represents a spatial position of a third graphical object in the user interface;
   determine a fourth pitch for a fourth sound based on the fifth coordinate location;
   determine a second tempo for the fourth sound based on the sixth coordinate location; and
   cause the audio device to output the fourth sound to convey information about the third graphical object.

6. The non-transitory computer-readable medium of claim 1, wherein the graphical object is a word, and further comprising program code that is executable by the processor for causing the processor to determine the first pitch based on an indentation level of a line of text that includes the word.

7. A method comprising:
   determining, by a processor, a first coordinate location and a second coordinate location that collectively represent a spatial position of a graphical object in a user interface;
   determining, by the processor, a first pitch for a foreground sound based on the first coordinate location, the foreground sound including a synthesized voice describing textual content associated with the graphical object;
   determining, by the processor, a second pitch for a background sound based on the second coordinate location;
   generating, by the processor, an audio signal configured to cause an audio device to output a composite sound that includes the foreground sound at the first pitch and the background sound at the second pitch;
   subsequent to causing the audio device to output the composite sound:
      determining, by the processor, a change in the first coordinate location of the graphical object and a change in the second coordinate location of the graphical object;
      determining, by the processor, a first modification to the foreground sound based on the change in the first coordinate location;
      determining, by the processor, a second modification to the background sound based on the change in the second coordinate location; and
      causing, by the processor, the audio device to output an updated composite sound that includes the foreground sound with the first modification and the background sound with the second modification;
   determining, by the processor, a third coordinate location and a fourth coordinate location that represents a spatial position of a second graphical object in the user interface, wherein the second graphical object is output concurrently with the graphical object in the user interface;
   determining, by the processor, a third pitch for a third sound based on the third coordinate location;
   determining, by the processor, a tempo for the third sound based on the fourth coordinate location; and
   causing, by the processor, the audio device to output the third sound having the third pitch and the tempo.

8. The method of claim 7, wherein the first coordinate location is a horizontal location along a horizontal axis of a coordinate system, and the second coordinate location is a vertical location along a vertical axis of the coordinate system.

9. The method of claim 7, wherein the first coordinate location is a vertical location along a vertical axis of a coordinate system, and the second coordinate location is a horizontal location along a horizontal axis of the coordinate system.

10. The method of claim 7, wherein the background sound includes a tone with the second pitch.

11. The method of claim 7, wherein the tempo is a first tempo, and further comprising:
   determining, by the processor, a fifth coordinate location and a sixth coordinate location that represents a spatial position of a third graphical object in the user interface;
   determining, by the processor, a fourth pitch for a fourth sound based on the fifth coordinate location;
   determining, by the processor, a second tempo for the fourth sound based on the sixth coordinate location; and
   causing, by the processor, the audio device to concurrently output the third sound and the fourth sound to simultaneously convey information about both the second graphical object and the third graphical object.

12. The method of claim 7, wherein the graphical object is a word, and further comprising determining the first pitch based on an indentation level of a line of text that includes the word.

13. A system comprising:
   a processor; and
   a memory device including instructions executable by the processor for causing the processor to:
      determine a first coordinate location and a second coordinate location that represent a spatial position of a graphical object in a user interface;
      determine a first pitch for a foreground sound based on the first coordinate location, the foreground sound including a synthesized voice describing textual content associated with the graphical object;
      determine a second pitch for a background sound based on the second coordinate location;
      cause an audio device to output a composite sound that includes the foreground sound at the first pitch and the background sound at the second pitch;
      subsequent to causing the audio device to output the composite sound:
         determine a change in the first coordinate location of the graphical object and a change in the second coordinate location of the graphical object;
         determine a first modification to the foreground sound based on the change in the first coordinate location;
         determine a second modification to the background sound based on the change in the second coordinate location; and
      cause the audio device to output an updated composite sound that includes the foreground sound with the first modification and the background sound with the second modification;
      determine a third coordinate location and a fourth coordinate location that represents a spatial position of a second graphical object in the user interface, wherein the second graphical object is output concurrently with the graphical object in the user interface;
determine a third pitch for a third sound based on the third coordinate location;
determine a tempo for the third sound based on the fourth coordinate location; and
cause the audio device to output the third sound having the third pitch and the tempo.

14. The system of claim 13, wherein the first coordinate location is a horizontal location along a horizontal axis of a coordinate system, and the second coordinate location is a vertical location along a vertical axis of the coordinate system.

15. The system of claim 13, wherein the first coordinate location is a vertical location along a vertical axis of a coordinate system, and the second coordinate location is a horizontal location along a horizontal axis of the coordinate system.

16. The system of claim 13, wherein the background sound includes a tone with the second pitch.

17. The system of claim 13, wherein the tempo is a first tempo, and further comprising program code that is executable by the processor for causing the processor to:
determine a fifth coordinate location and a sixth coordinate location that represents a spatial position of a third graphical object in the user interface;
determine a fourth pitch for a fourth sound based on the fifth coordinate location;
determine a second tempo for the fourth sound based on the sixth coordinate location; and
cause the audio device to output the third sound and the fourth sound to simultaneously convey information about both the second graphical object and the third graphical object.

* * * * *